US011236702B2

(12) United States Patent
Laforest et al.

(10) Patent No.: US 11,236,702 B2
(45) Date of Patent: Feb. 1, 2022

(54) SELECTABLE MODE RAMJET/ROCKET JET ENGINE

(71) Applicant: 8801541 CANADA INC., Sainte-Hedwidge-de-Roberval (CA)

(72) Inventors: Luc Laforest, Roberval (CA); Timothy S. Rupcich, Kenaston (CA)

(73) Assignee: 8801541 Canada Inc., Quebec (CA)

( * ) Notice: Subject to any disclaimer, the term of this patent is extended or adjusted under 35 U.S.C. 154(b) by 1196 days.

(21) Appl. No.: 14/897,313

(22) PCT Filed: Jun. 10, 2014

(86) PCT No.: PCT/CA2014/050535
§ 371 (c)(1),
(2) Date: Mar. 1, 2016

(87) PCT Pub. No.: WO2014/197982
PCT Pub. Date: Dec. 18, 2014

(65) Prior Publication Data
US 2021/0047985 A1    Feb. 18, 2021

Related U.S. Application Data

(60) Provisional application No. 61/833,208, filed on Jun. 10, 2013.

(51) Int. Cl.
*F02K 7/00* (2006.01)
*F02K 7/18* (2006.01)
*F02K 9/62* (2006.01)
*F23R 3/02* (2006.01)
*F02K 9/78* (2006.01)

(52) U.S. Cl.
CPC .................. *F02K 7/18* (2013.01); *F02K 9/62* (2013.01); *F23R 3/02* (2013.01); *F02K 9/78* (2013.01); *F05B 2220/10* (2013.01); *F05D 2220/10* (2013.01)

(58) Field of Classification Search
CPC ....................................................... F02K 7/18
See application file for complete search history.

(56) References Cited

U.S. PATENT DOCUMENTS

| | | | | | |
|---|---|---|---|---|---|
| 2,883,829 | A | * | 4/1959 | Africano | F02K 7/18 60/245 |
| 3,279,187 | A | * | 10/1966 | Lindman | F02K 7/18 60/245 |
| 2012/0067053 | A1 | * | 3/2012 | Ress, Jr. | F23R 3/26 60/772 |

* cited by examiner

*Primary Examiner* — Edwin Kang
(74) *Attorney, Agent, or Firm* — Crowell & Moring LLP

(57) ABSTRACT

The jet engine comprising a ramjet air path extending from an intake, into a combustion chamber, and out an exhaust nozzle, a fuel inlet leading into the combustion chamber, an oxidizer inlet leading into the combustion chamber and a partition being operable to selectively close the ramjet air path upstream of the combustion chamber to allow operation of the jet engine in rocket mode and open the ramjet air path to allow operation of the jet engine in ramjet mode.

12 Claims, 10 Drawing Sheets

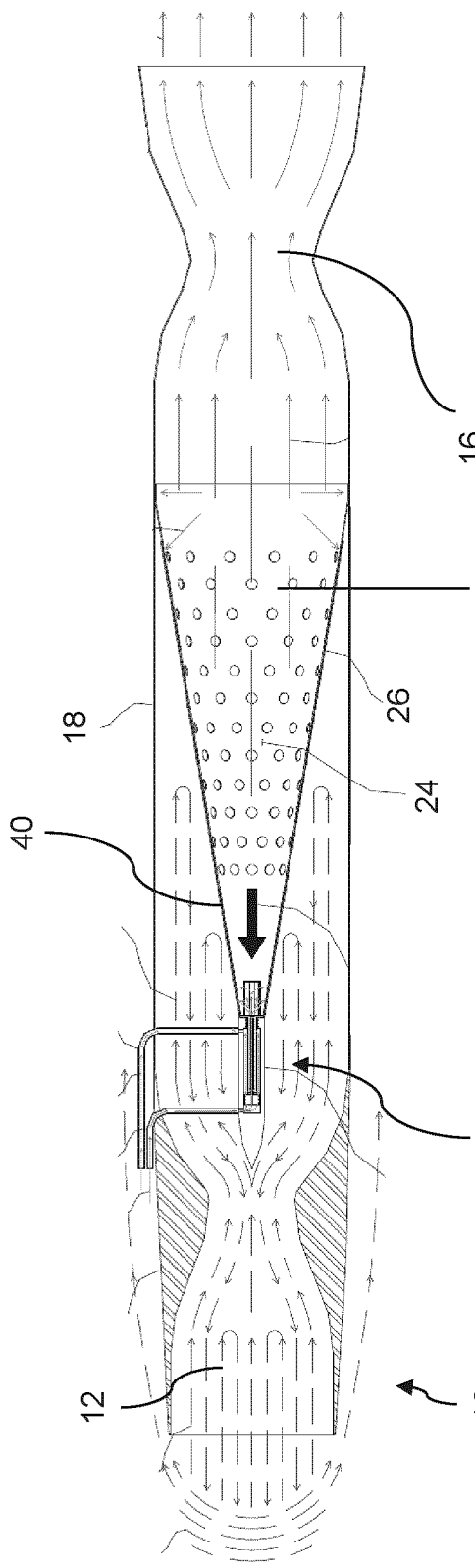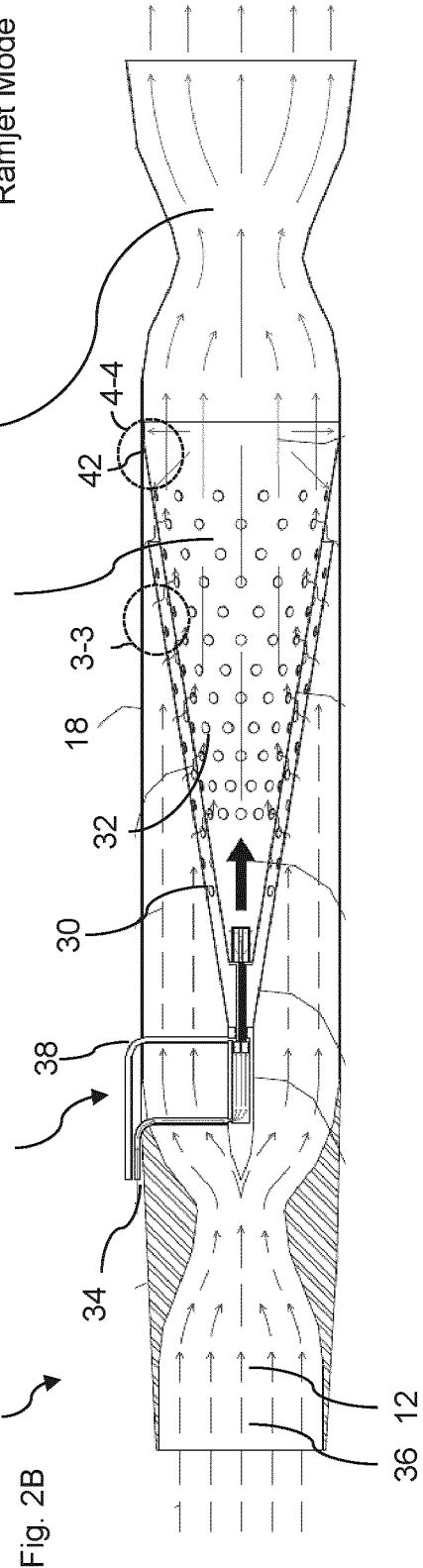
Fig. 2A  Rocket Mode
Fig. 2B  Ramjet Mode

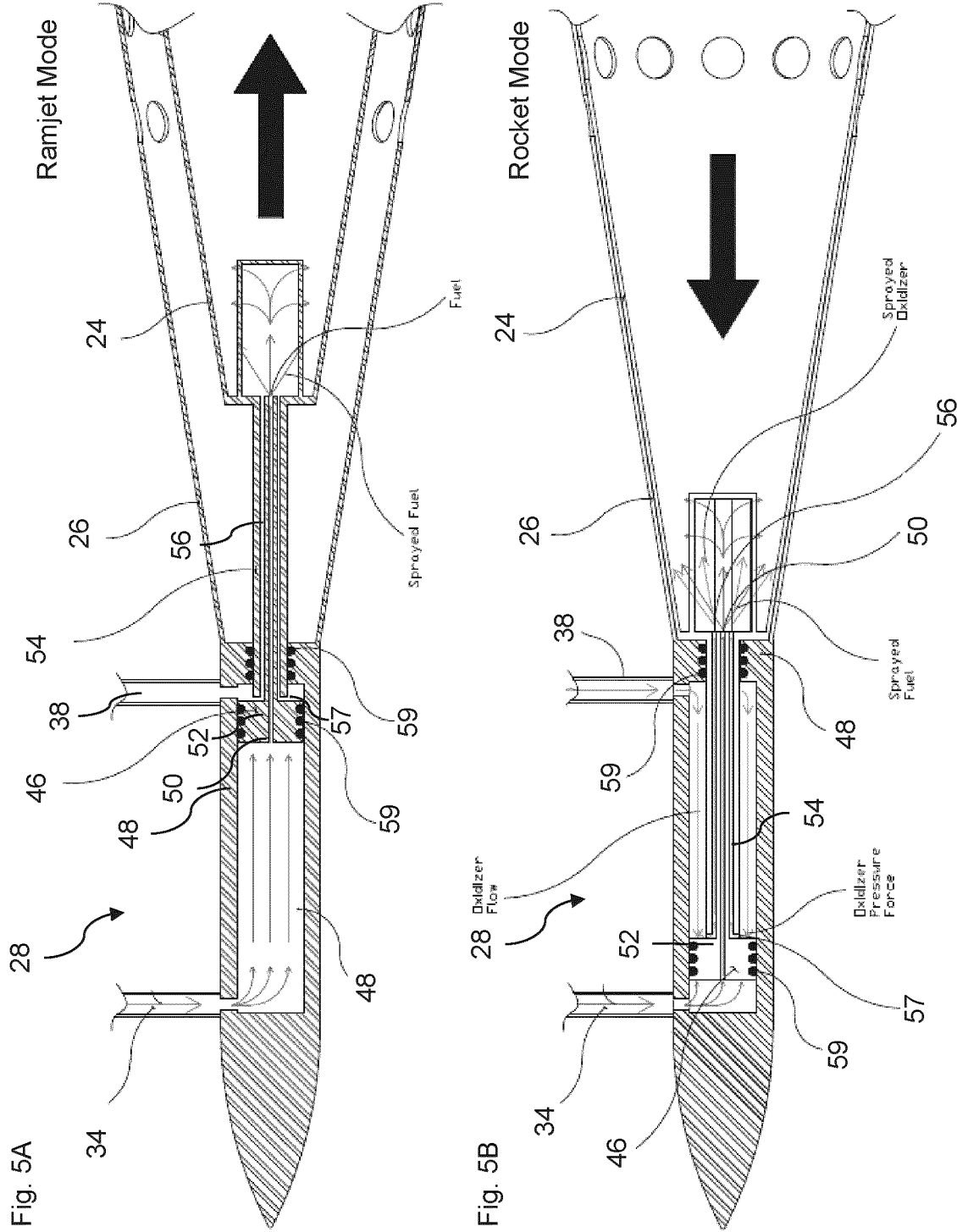

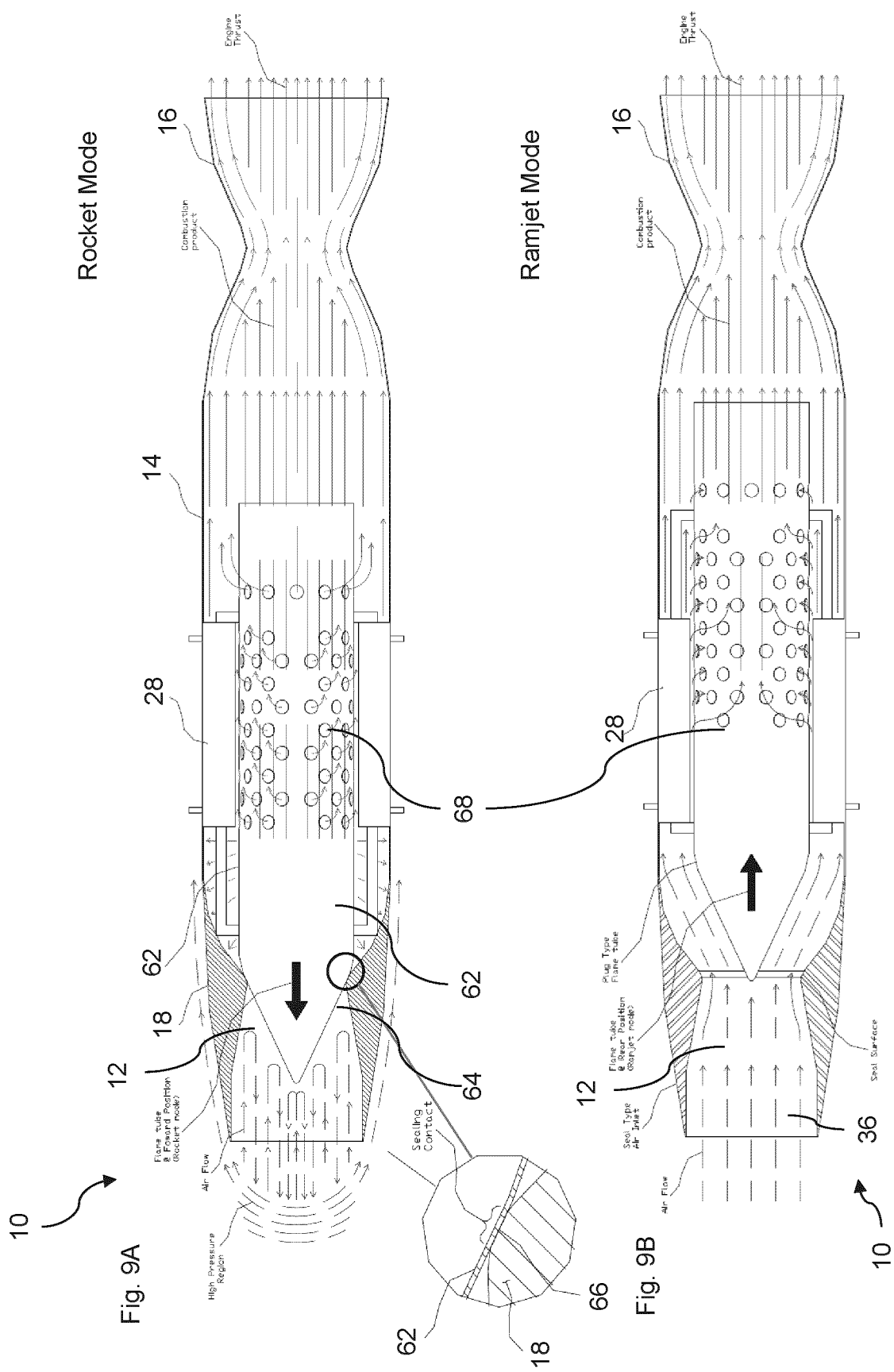
Fig. 9A Rocket Mode
Fig. 9B Ramjet Mode

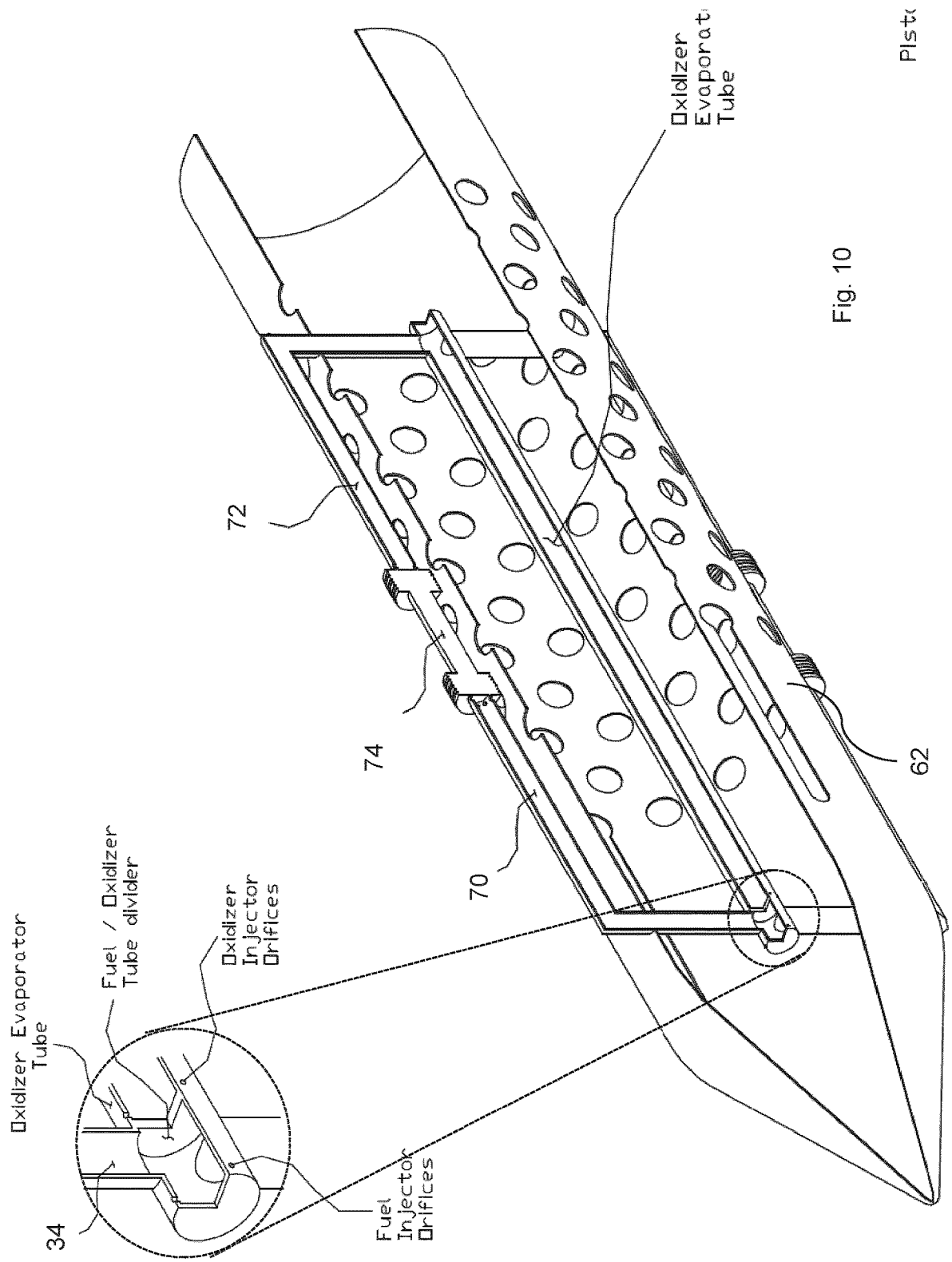

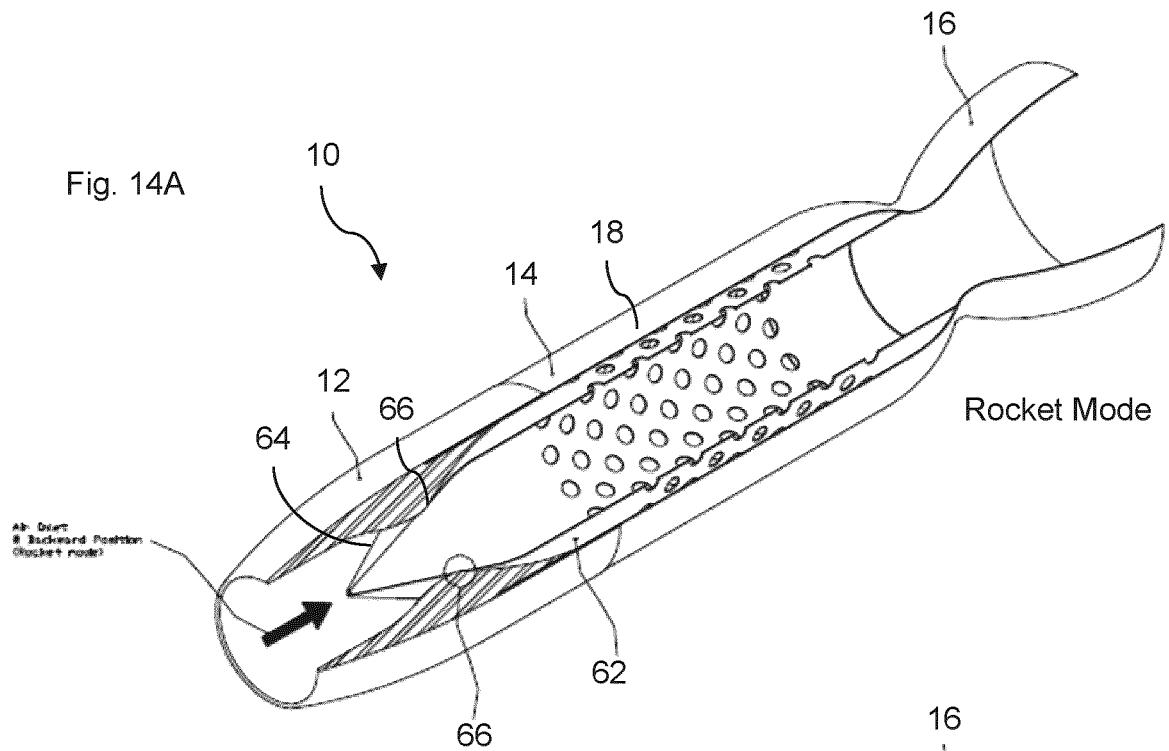
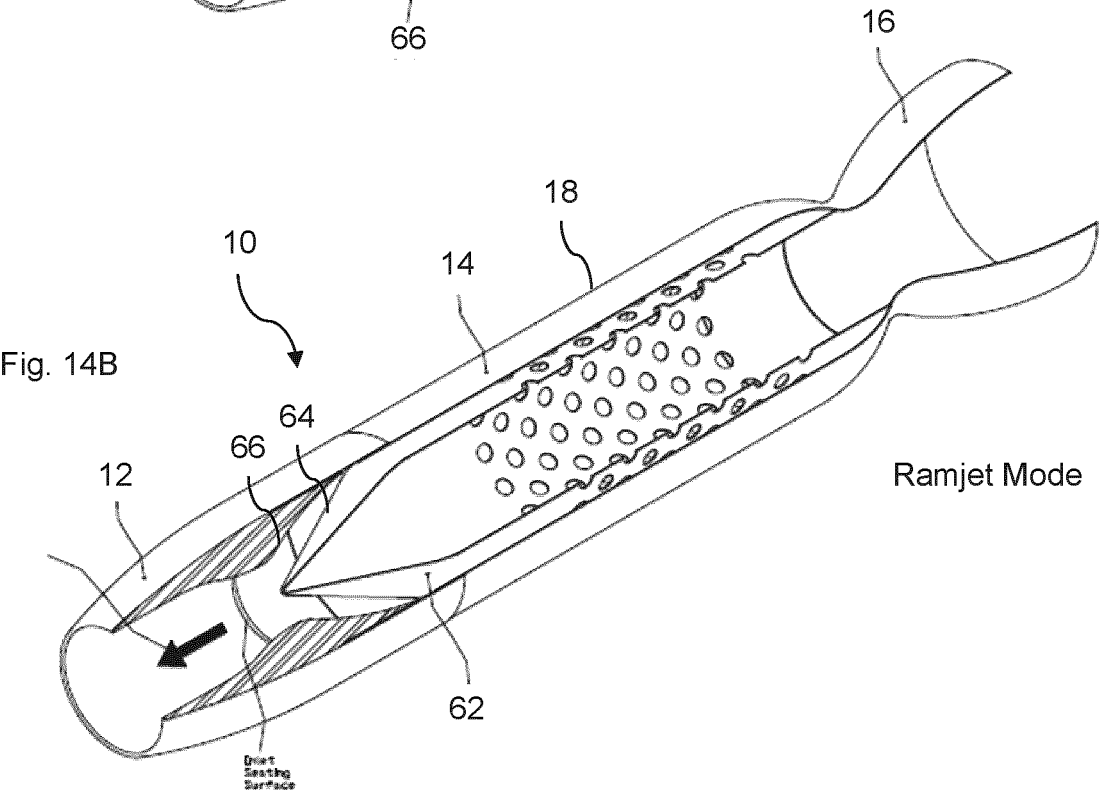

SELECTABLE MODE RAMJET/ROCKET JET ENGINE

CROSS-REFERENCE TO RELATED APPLICATIONS

This application is a National Stage of International Application No. PCT/CA2014/050535 filed with the Canadian Patent Office on Jun. 10, 2014, which claims priority to U.S. provisional application No. 61/833,208 filed Jun. 10, 2013, wherein the entirety of each of the aforementioned applications is hereby incorporated herein by reference.

FIELD

This specification generally relates to the field of jet engines, and more specifically to a jet engine which can selectively operate either in a ramjet mode or in a rocket mode.

BACKGROUND

Ramjets and rocket engines are two types of engines which have been known for decades. The ramjet engine is an air breathing engine which relies on the atmosphere for a supply of oxidizer (air) used in combustion. By contrast, the rocket engine is not an air-breathing engine as it does not have an intake, and rather has a supply of both fuel and oxidizer. In some rocket engines, the fuel and the oxidizer are provided in the form of a solid composition whereas in other rocket engines, liquid and/or gaseous fuel and oxidizer are used.

A ramjet engine can be considered advantageous over a rocket engine as since it uses the atmosphere, it can require less supplies or travel a greater distance using a same initial supply. Rocket engines can be considered advantageous over ramjet engines in applications for use outside atmosphere or where the air is so thin that it is not sufficient to allow ramjet mode.

Various former designs, typically referred to as integral rocket/ramjet engines, provide a combination of rocket and ramjet engine modes. Although satisfactory to a certain degree, there remained room for improvement. In particular, there remained a need to be able to switch freely from one mode of operation to the other, and back to the initial mode if required.

SUMMARY

This specification describes a jet engine which can function selectively either in ramjet mode where it uses air from the atmosphere, and in rocket mode, where the combustion chamber is partitioned from the intake and uses an oxidizer from an independent source.

In accordance with one aspect, there is provided a jet engine comprising a ramjet air path extending from an intake, into a combustion chamber, and out an exhaust nozzle, a fuel inlet leading into the combustion chamber, an oxidizer inlet leading into the combustion chamber and a partition being operable to selectively close the ramjet air path upstream of the combustion chamber to allow operation of the jet engine in rocket mode and open the ramjet air path to allow operation of the jet engine in ramjet mode.

In accordance with another aspect, there is provided a method of operating a jet engine comprising: operating the jet engine in ramjet mode including supplying fuel through the fuel inlet and maintaining the partition open; and subsequently to operating the jet engine in ramjet mode, operating the jet engine in rocket mode by supplying fuel through the fuel inlet and oxidizer through the oxidizer inlet and maintaining the partition closed.

Many further features and combinations thereof concerning the present improvements will appear to those skilled in the art following a reading of the instant disclosure.

DESCRIPTION OF THE FIGURES

In the figures,

FIGS. 2A and 2B are cross-sectional views of the jet engine of FIG. 1, with FIG. 2A showing the jet engine in rocket mode and FIG. 2B showing the jet engine in ramjet mode;

FIGS. 5A and 5B are enlarged cross-sectional views of the jet engine of FIG. 1, with FIG. 5B showing the linear actuator in rocket mode and FIG. 5A showing the linear actuator in ramjet mode;

FIGS. 9A and 9B are cross-sectional views of a second example of a jet engine, with FIG. 9A showing the jet engine in rocket mode and FIG. 2B showing the jet engine in ramjet mode;

FIGS. 10 and 11 are oblique views, partly sectioned, showing internal components of the jet engine of FIGS. 9A and 9B in greater detail;

FIGS. 14A and 14B are oblique views, partly sectioned, of a third example concept of a jet engine, with FIG. 14A showing the jet engine in rocket mode and FIG. 14B showing the jet engine in ramjet mode;

DETAILED DESCRIPTION

Figure 1:
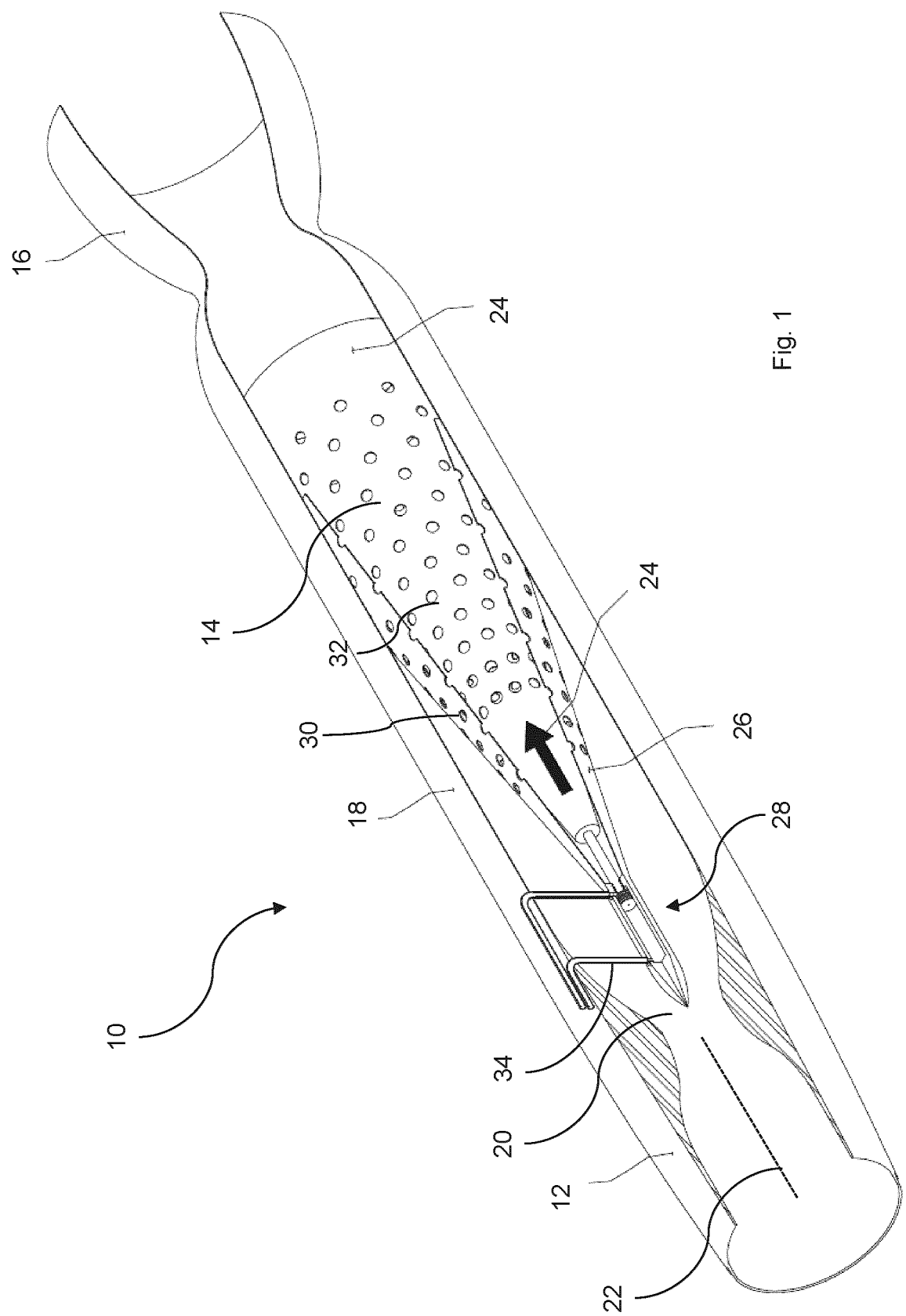
FIG. 1 is an oblique view, partly sectioned, of a first example of a jet engine selectively operable in rocket mode and ramjet mode.
Figure 4:
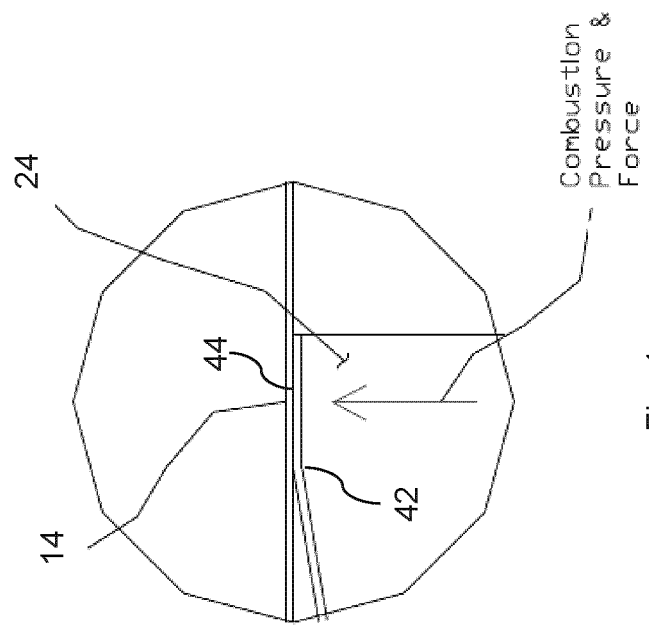
FIGS. 3 and 4 are enlarged sections of FIG. 2B.

FIG. 1 shows a first example of a jet engine 10 operable selectively in either one of rocket mode and ramjet mode. The jet engine 10 can generally be seen to have an intake 12, a combustion chamber 14, and an exhaust nozzle 16 in fluid flow communication. In this specific embodiment, the intake 12 and exhaust nozzle 16 are made integral to a casing 18 which forms a duct 20 inside which the fluid can flow in a contained fashion. In this embodiment, the components are generally concentric to a main axis 22 of the jet engine 10 and are in an axial alignment with one another, though it will be understood that alternate embodiments can take various alternate shapes.

In this embodiment, the combustion chamber 14 has two flame walls: an inner flame wall 24 and an outer flame wall 26. Both flame walls 24, 26 are apertured. While the outer flame wall 26 in this embodiment is made integral to the casing 18, the inner flame wall 24 is free to slide linearly towards the outer flame wall 26, along the main axis 22. The inner flame wall 24 can thus be considered a slidable component and the outer flame wall 26 can be considered a seat component in this embodiment. A linear actuator 28 is provided at the tip of the outer flame wall 26 which is connected to the inner flame wall 24 and which can selectively move the inner flame wall 24 relative to the outer flame wall 26. FIG. 1 shows the jet engine 10 in ramjet mode, with the outer flame wall 26 and inner flame wall 24 axially spaced apart from one another, which allows ram air from the intake 12 to flow successively across the apertures 30, 32 of the outer flame wall 26 and of the inner flame wall 24 to enter the combustion chamber 14. In this example, the flame walls (or tubes) 24, 26 have a generally conical shape, though it will be understood that in alternate embodiments, other surface-of-revolution shapes which broaden out from the tip to the exhaust nozzle can be used, such as an ogive shape or bullet shape, for instance.

Fuel is provided to the combustion chamber 14 from a fuel line 34, as will be detailed below, where it is mixed with ram air and ignited for combustion and propulsion.

The general flow of air along an ramjet air path 36 is shown with arrows in FIG. 2B, which shows the jet engine 10 in the same mode of operation than FIG. 1.

Figure 3:
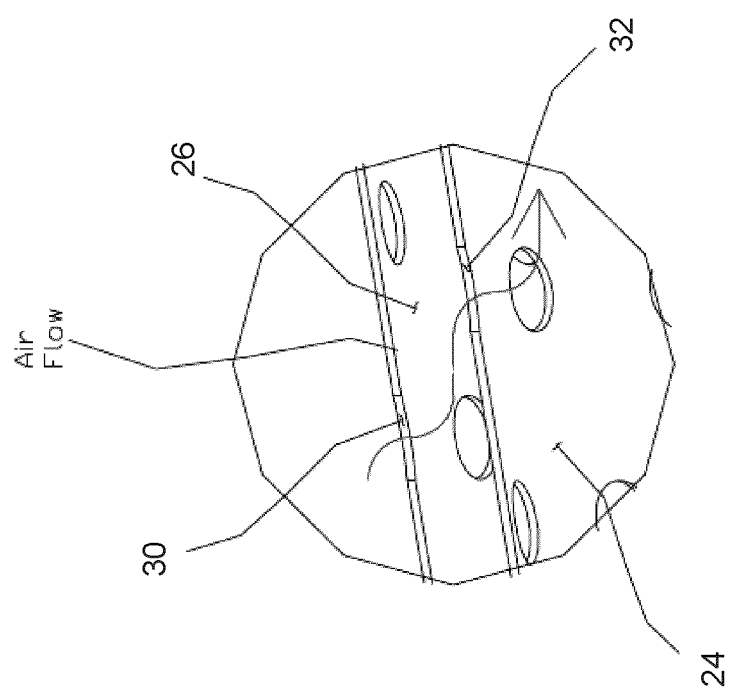

FIG. 2A shows the jet engine 10 in rocket mode with the inner flame wall 24 pulled into sealing, abutting contact with the outer flame wall 26 by the actuator 28. In this mode, the inner flame wall 24 and the outer flame wall 26 form a partition 40 upstream of the combustion chamber 14 which is adapted to operate the jet engine 10 in rocket mode. In rocket mode, fuel (the same fuel than during ramjet mode or another fuel) and oxidizer are supplied to the combustion chamber 14 by respective lines 34, 38. As will be detailed below, it is the pressure of the supply lines 34, 38, and more specifically the pressure of the oxidizer supply line 38 in the illustrated case, which operates the actuator 28 and moves the inner flame wall 24 in this embodiment. It will be understood, as shown in the figures (see also FIG. 3), that the apertures 30 of the inner flame wall 24 are arranged so as to be disaligned with the apertures 32 of the outer flame wall 26 when in the abutment position thereagainst, to form an airtight partition 40. The inner flame wall 24 has a conical downstream end 42 in this embodiment which mates with the conical shape of the casing 18. Combined with the combustion pressure in the combustion chamber 14 during operation, the conical downstream end 42 can form a seal 44 against the casing 18 and form another portion of the partition 40.

Turning now to FIGS. 5A and 5B, the linear actuator 28 principle is shown in greater detail. In this embodiment, the oxidizer line pressure was significantly higher than the fuel line pressure (e.g. ~800 PSI vs. ~400 PSI). This difference of pressure was used to drive the linear actuator 28. More specifically, the linear actuator 28 is in the form of a piston 46 and cylinder 48 assembly with the piston 46 being slidably received in the cylinder 48. Moreover, the piston 46 forms a seal against the inner wall surface of the cylinder 48 to sealingly separate the portions of the chamber on both opposite sides thereof. The supply lines 34, 38 are connected to corresponding sides of the piston 46. One of the supply lines, in this case the fuel supply line 34, has a fuel conduit 50 extending across a head 52 of the piston 46, and internally along a piston rod 54 which connects the piston 46 to the slidable component (here the inner flame wall 24). When the jet engine operates in ramjet mode, the oxidizer line 38 can be closed, in which case the only line pressure acting on the piston 46 is the fuel line pressure which biases the piston 46 towards one end of the cylinder 48. When the jet engine 10 is switched to rocket mode, the greater line pressure in the oxidizer supply line 38 overcomes the fuel line pressure and moves the piston 46 to the other end of the cylinder 48, during which movement the piston rod 54 pulls the slidable component. In this example, the piston 46 movable relative to the casing 18, and the cylinder 48 is fixed relative to the casing 18, and the oxidizer line pressure is used to pull the slidable component, but it will be understood that in alternate embodiments, these latter features can vary.

It will be noted here that the actuator function of the piston 46 and cylinder 48 assembly functions here independently from the conveying function of fuel and oxidizer. More specifically, the fuel line 34 leads to one side of the piston 46, and continues across the head 52 of the piston 46 and along the piston rod 54, to reach the combustion chamber 14. Moreover, in this embodiment, the piston rod 54 has an oxidizer conduit 56 concentric to the fuel conduit 50 along the piston rod 54, and apertures 57 provided adjacent the piston 46 and leading into the oxidizer conduit 56 allow the oxidizer to be conveyed inside the piston rod 54 and to the combustion chamber 14. In alternate embodiments, it can be the oxidizer line 38 that extends across the piston 46 and internally to the fuel line 34 in the piston rod 54, rather than the fuel line 34, for instance.

Figure 8:
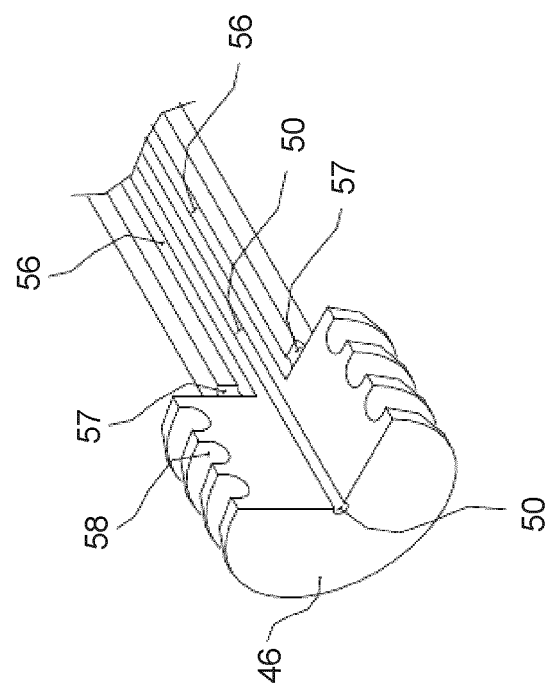
FIG. 8 is an enlarged portion of FIG. 7.
Figure 7:
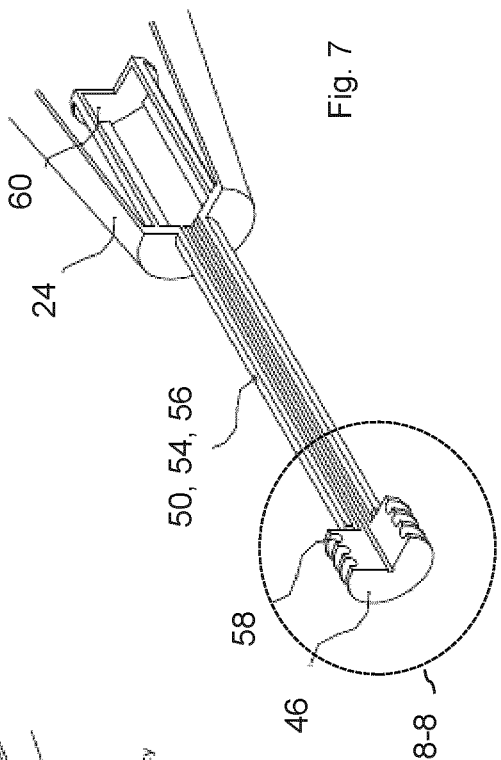
FIG. 7 is an oblique view, partly sectioned, of the piston and piston rod of the linear actuator of the jet engine of FIG. 1.
Figure 6:
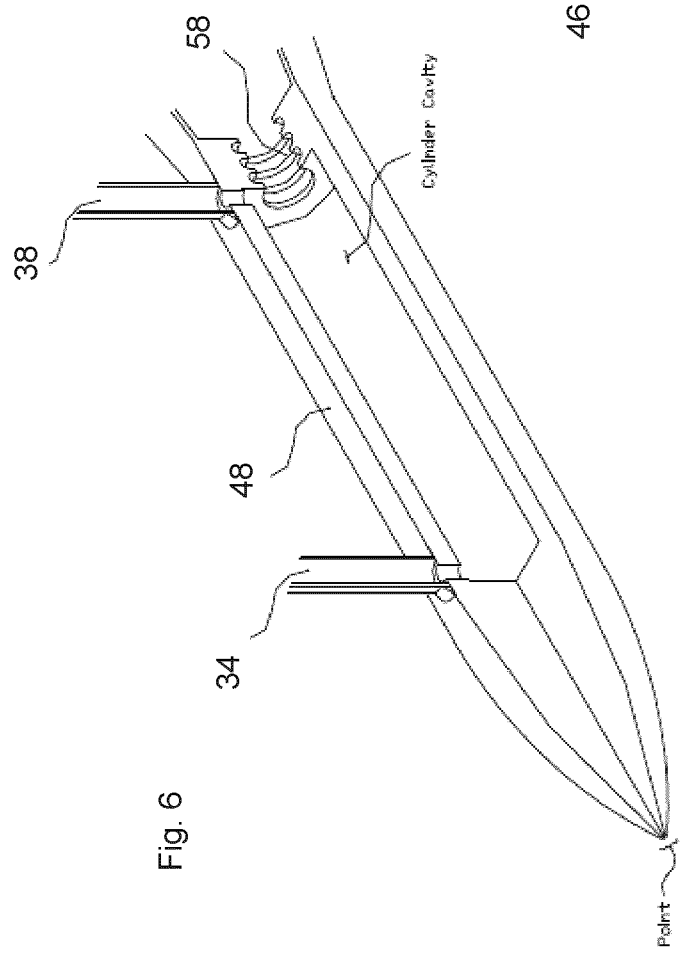
FIG. 6 is an oblique view, partly sectioned, of the cylinder of the linear actuator of the jet engine of FIG. 1.

FIGS. 6 to 8 illustrate the piston 46 and cylinder 48 assembly in greater detail. As can be seen in FIG. 6, seal grooves 58 adapted to receive sealing rings 59 (shown in FIGS. 5A and 5B) are provided in the end of the cylinder 48 around the piston rod 54 to provide sealing. FIG. 8 shows the conduit configuration within the piston 46 and piston rod 54 in greater detail. As shown in FIG. 7, a splash plate 60 can be incorporated to the inner flame wall 24, for the injected fuel and oxidizer to impinge thereagainst, to favor vaporization and mixing for combustion.

As described above, it will be understood that the jet engine 10 can be selectively operated in rocket mode, then ramjet mode, and back to rocket mode, or vice versa, providing an interesting amount of versatility.

FIGS. 9A and 9B show a second embodiment of a jet engine 10 for operation selectively either in ramjet or rocket mode. In this second embodiment, a single flame wall 62 is provided in a generally cylindrical shape with a conical upstream end 64. The flame wall 62 can be slid axially by way of linear actuators in a manner generally similar to that described above. The ramjet air path 36 is closed in this embodiment by the interaction between the conical upstream end 64 of the flame wall 62 and an annular seat surface 66 provided adjacent the throat of the intake duct 12. By way of apertures 68 provided across the flame wall 62, a portion of the ramjet air can flow into the flame wall 62 while another portion bypasses the inside of the flame wall 62 entirely during ramjet mode. An angle of the annular seat surface 66 of 25° relative to the main axis 22 can be suitable in this embodiment, for instance.

Figure 13:
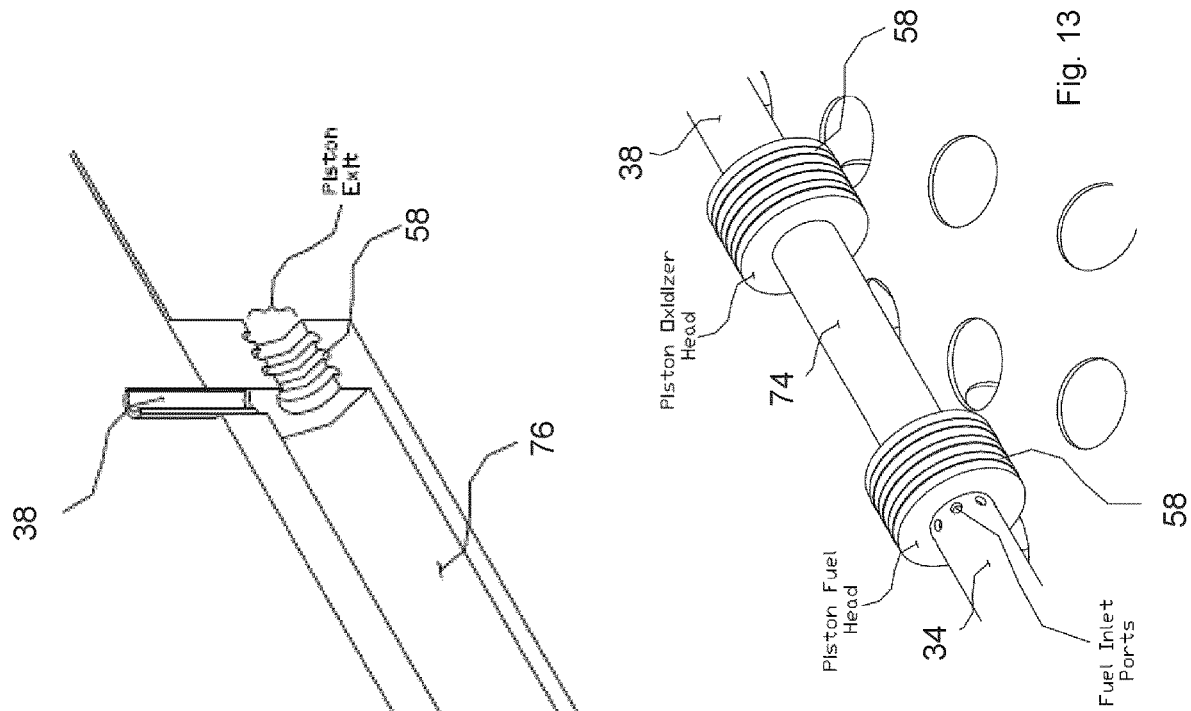
FIG. 13 is an oblique view showing a piston assembly of the jet engine of FIGS. 9A and 9B in greater detail.
Figure 11:
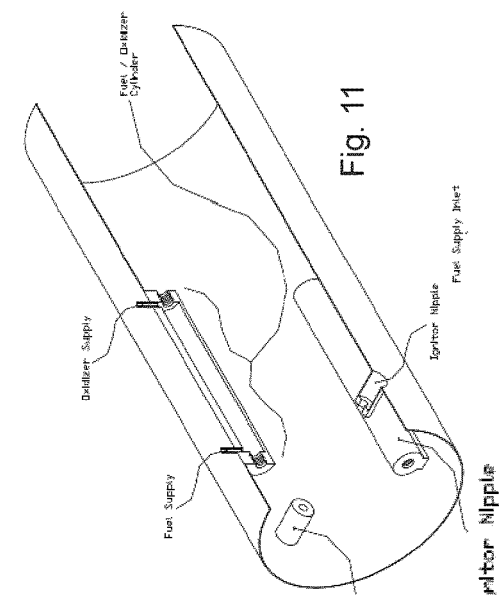
Figure 12:
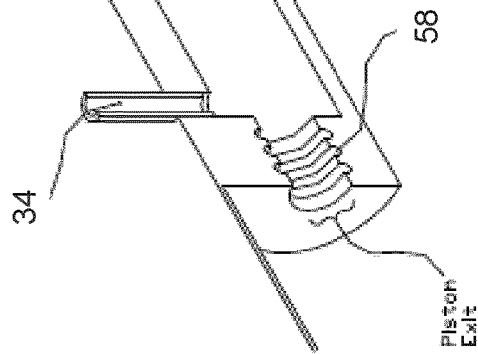
FIG. 12 is an oblique cross-section view showing a cylinder of the jet engine of FIGS. 9A and 9B.

The flame wall assembly is shown in greater detail in FIG. 10 where it is seen made integral to a network of fuel supply tubes 70 and oxidizer supply tubes 72 and divider pistons 74. The divider pistons 74, shown in greater detail in FIG. 13, are housed within corresponding cylinders 76 (see FIG. 12) and can be operated to slide the flame wall 62 using pressure from the supply inlets or any other suitable actuation source.

The flame wall 62 is thus a slidable component and the intake duct 12 can be said to form a seat component, with both these components forming a selectively openable or closable partition.

FIGS. 14A and 14B conceptually show a third partition embodiment of a jet engine 10 for operation selectively in either ramjet or rocket mode. In this concept, the air intake duct 12 slides along the combustion chamber portion 14 of the engine casing 18 to selectively move into abutment against a conical portion 64 of the flame wall 62 to close the ramjet air path 36 for rocket mode operation (FIG. 14A) or away from the flame wall 62 to open the ramjet air path 36 for ramjet mode operation (FIG. 14B). The air intake duct 12 can be said to be a slidable component and the flame wall 12 can be said to be a seat component.

Figure 15A:
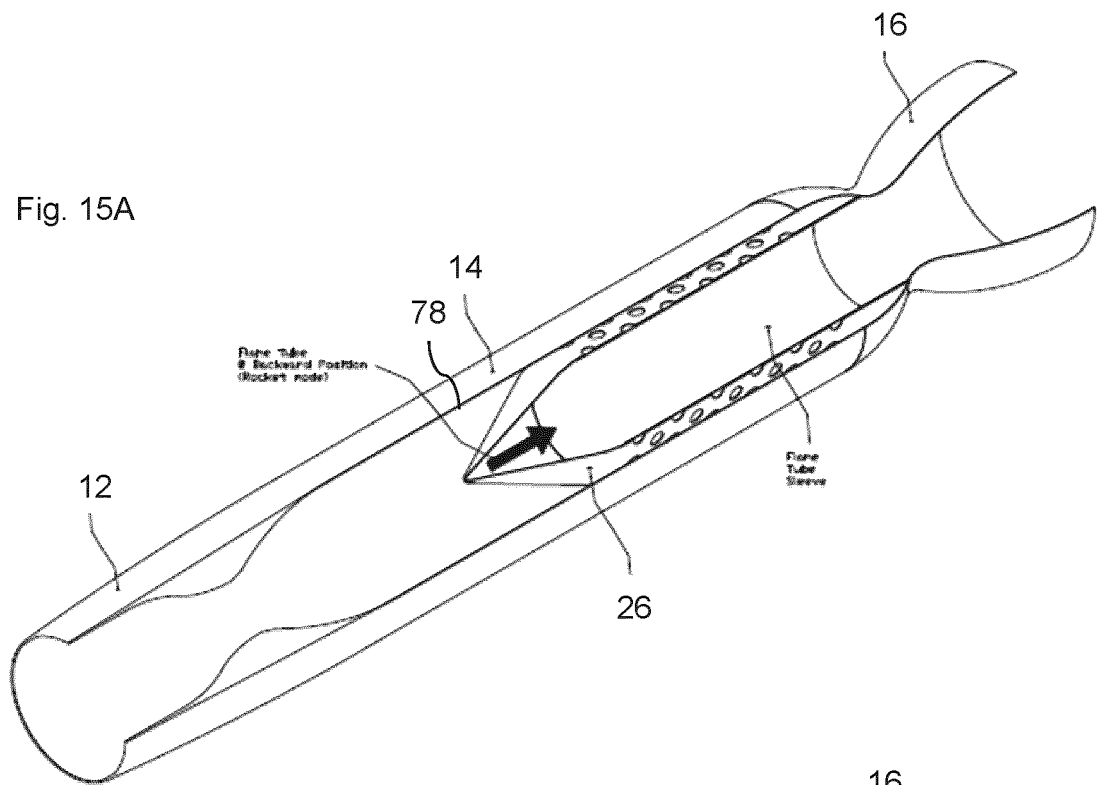
FIGS. 15A and 15B are oblique views, partly sectioned, of a fourth example concept of a jet engine, with FIG. 15A showing the jet engine in rocket mode and FIG. 15B showing the jet engine in ramjet mode.
Figure 15B:
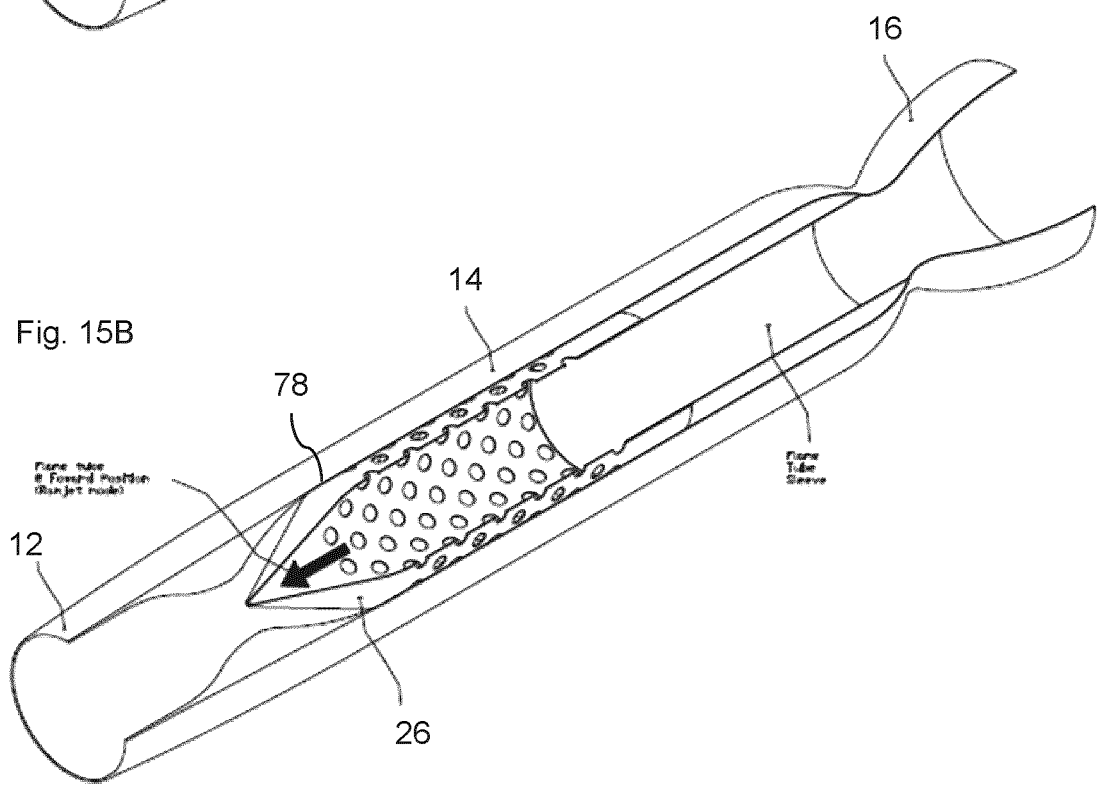

FIGS. 15A and 15B conceptually show a fourth partition embodiment of a jet engine 10 for operation selectively in either ramjet or rocket mode. In this concept, outer flame wall 26 is generally cylindrical and slides along an inner duct portion 78 which is not apertured in a manner that when fully retracted therealong, the apertures 30 in the outer flame wall 26 are closed by the inner duct portion 78, closing the ramjet air path 36 for rocket mode operation (FIG. 15A) and when fully extended, the outer flame wall 26 opens the ramjet air path 36 for ramjet mode operation (FIG. 15B). The outer flame wall 26 can be said to be a slidable component and the inner duct portion can be said to be a seat component.

In alternate embodiments, it will be understood that the closing or opening of the ramjet air supply path 36 can be done by rotating two flame tubes relative to one another to selectively align or disalign the apertures thereof, and so the actuator can be a rotary actuator rather than a linear actuator, for instance.

In the embodiments described above, it will be understood that although the fuel quantity compared to the oxidizer quantity can be adjusted or regulated by other means or other devices like fuel and oxidizer control units or valves, the number or size of oxidizer fluid inlet ports and channels or injector holes can be governed by the intended fuel and oxidizer ratio depending on the fuel or oxidizer type selected for a specific application. For example, if the engine is to be operated using kerosene as fuel and liquid oxygen as oxidizer, and the preferred fuel/oxidizer mixing ratio is one part of fuel for six part of oxidizer fluid, or a 6 to 1 oxidizer fuel ratio, then, the oxidizer ports and channels can be provided six times bigger than the fuel inlet ports and channels.

As can be seen from the above, the examples described above and illustrated are intended to be exemplary only. For instance, the intake and the exhaust nozzle can greatly depart from those illustrated in alternate embodiments, and their design can be adapted to specific applications using common general knowledge of persons ordinarily skilled in this art. Moreover, although the embodiments illustrated can be suitable for subsonic speeds, it will be understood that alternate embodiments can be readily adapted to supersonic speeds. The scope is indicated by the appended claims.

What is claimed is:

1. A jet engine comprising:
a ramjet air path extending from an intake, into a combustion chamber, and out an exhaust nozzle;
a fuel inlet leading into the combustion chamber;
an oxidizer inlet leading into the combustion chamber; and
a partition being operable to selectively close the ramjet air path upstream of the combustion chamber to allow operation of the jet engine in a rocket mode, and to selectively open the ramjet air path to allow operation of the jet engine in a ramjet mode;
an actuator operable to close the partition when subjected to a pressure of an oxidizer via the oxidizer inlet, wherein the actuator is a linear actuator, and wherein the linear actuator comprises:
a cylinder housing a piston head in a sealed, slidable engagement, the piston head being connected to a piston rod, the piston rod extending outside the cylinder;
an oxidizer line leading to one side of the piston head, and extending out the cylinder to the oxidizer inlet; and
a fuel line leading to the other side of the piston head, and extending out of the cylinder, to the fuel inlet, with one of the fuel line and the oxidizer line extending across the piston head and inside the piston rod.

2. The jet engine of claim 1, wherein the partition is in a form of at least two mating, apertured, flame walls of the combustion chamber, the at least two mating, apertured flame walls forming a seal closing the ramjet air path by abutment against one another with apertures of a first flame wall of the at least two mating, aperture flame walls being misaligned with apertures of a second flame wall of the at least two mating, aperture flame walls.

3. The jet engine of claim 2, wherein the first flame wall is movable away from the second flame wall to open the ramjet air path.

4. The jet engine of claim 3, wherein the actuator is mounted between the first flame wall and a casing of the jet engine, the actuator being operable to selectively move the first flame wall away and against the second flame wall.

5. The jet engine of claim 2, wherein each of the at least two mating, apertured flame walls is a surface with a revolution shape, having a narrow tip at an upstream end.

6. The jet engine of claim 5, wherein the surface with the revolution shape is a conical shape.

7. The jet engine of claim 1, wherein the actuator is biased by a pressure of fuel via the fuel inlet to maintain the partition open in an absence of the pressure of the oxidizer via the oxidizer inlet.

8. The jet engine of claim 1, wherein the other one of the fuel line and the oxidizer line also extends inside the piston rod.

9. The jet engine of claim 1, wherein one of the piston and the cylinder is fixed relative to a casing of the jet engine, and the other one of the piston and the cylinder is fixed to a slidable wall which slides into sealing abutment against a seat wall when the piston head is subjected to the oxidizer pressure thereby closing the partition.

10. A method of operating a jet engine, comprising:
providing a ramjet air path extending from an intake, into a combustion chamber, and out an exhaust nozzle;
providing a fuel inlet leading into the combustion chamber; providing an oxidizer inlet leading into the combustion chamber;
providing a partition being operable to selectively close the ramjet air path upstream of the combustion chamber to allow operation of the jet engine in a rocket mode, and to selectively open the ramjet air path to allow operation of the jet engine in a ramjet mode;
providing an actuator operable to close the partition when subjected to a pressure of an oxidizer via the oxidizer inlet, wherein the actuator is a linear actuator, and wherein the linear actuator comprises:

a cylinder housing a piston head in a sealed, slidable engagement, the piston head being connected to a piston rod, the piston rod extending outside the cylinder;

an oxidizer line leading to one side of the piston head, and extending out the cylinder to the oxidizer inlet; and a fuel line leading to the other side of the piston head, and extending out of the cylinder, to the fuel inlet, with one of the fuel line and the oxidizer line extending across the piston head and inside the piston rod;

operating the jet engine in the ramjet mode by supplying fuel through the fuel inlet and maintaining the partition open; and operating the jet engine in the rocket mode by supplying the fuel through the fuel inlet and the oxidizer through the oxidizer inlet and maintaining the partition closed, wherein operating the jet engine in the rocket mode is performed after operating the jet engine in the ramjet mode.

11. The method of operating a jet engine of claim 10, wherein the same fuel is supplied during both the ramjet mode and the rocket mode.

12. The method of operating a jet engine of claim 10, further comprising:

operating the jet engine in the rocket mode, including supplying the fuel through the fuel inlet, supplying the oxidizer through the oxidizer inlet, and maintaining the partition closed, wherein operating the jet engine in the rocket mode also occurs prior to operating the jet engine in the ramjet mode.

* * * * *